United States Patent [19]

Borg

[11] Patent Number: 4,489,394
[45] Date of Patent: Dec. 18, 1984

[54] MICROPROCESSOR POWER ON RESET SYSTEM

[75] Inventor: Arthur N. Borg, Lake Forest, Ill.

[73] Assignee: Zenith Electronics Corporation, Glenview, Ill.

[21] Appl. No.: 370,316

[22] Filed: Apr. 21, 1982

[51] Int. Cl.³ .............................................. G06F 1/00
[52] U.S. Cl. .................................................. 364/900
[58] Field of Search ... 364/200 MS File, 900 MS File

[56] References Cited

U.S. PATENT DOCUMENTS

| 3,535,560 | 10/1970 | Cliff | 364/200 |
| 4,080,659 | 3/1978 | Francini | 364/200 |
| 4,279,020 | 7/1981 | Christian | 364/900 |

Primary Examiner—Raulfe B. Zache
Assistant Examiner—David Y. Eng

[57] ABSTRACT

Initialization problems in a microprocessor controlled system due to power interrupts or rapid cycling of the ON/OFF control are eliminated by insuring that a logic initialization signal is provided only after microprocessor power up and is removed before the microprocessor is subject to a power outage. By insuring the proper sequencing of the microprocessor initialization input signal and the supply voltage applied thereto, microprocessor operation is initiated under the proper logic and timing conditions. The present invention is particularly adapted for use in a microprocessor controlled tuning system for a television receiver where the power supply is operated not from horizontal scan circuitry but from a conventional 60 Hz power supply. The large time constants used with this low frequency power supply for optimum signal processing generally result in a more rapid decay of the power supply input than the power on reset, or initialization, signal. This may cause microprocessor initialization problems if power is reapplied to the television receiver after a short period. At the start of a power outage, the initialization signal is coupled to and grounded by a shunt regulator to the microprocessor which regulates the 60 Hz power applied thereto.

9 Claims, 2 Drawing Figures

MICROPROCESSOR POWER ON RESET SYSTEM

BACKGROUND OF THE INVENTION

This invention generally relates to microprocessors and more specifically is directed to a system for insuring proper microprocessor initialization following the removal and reapplication of power to the microprocessor.

When power is applied to a system incorporating a microprocessor, the microprocessor is typically energized after a suitable safe time delay allowing for system stabilization for providing various, well-defined power supply levels thereto. The microprocessor then generally enters an initialization or reset routine wherein the microprocessor program counter is set to a zero count. The microprocessor then calls out the location in its read only memory (ROM) whose address is represented by the zero count in the program counter. The contents of that memory location initiates the initialization program routine which initializes the buffer pointers and the output port latches of the microprocessor. In general, this initialization routine defines and establishes the initial conditions for microprocessor operation including a resetting of its logic to an initialized condition from which subsequent operation may proceed.

To accomplish this initialization process, generally two signals are provided to the microprocessor. One input is from a power supply which provides the voltage level necessary for proper logic circuitry operation. Another input, generally termed the power on reset signal, initiates the initialization routine previously described. These two inputs are generally provided by the same signal source, e.g., a DC power supply. The sequence in which these two inputs are provided to the microprocessor is important in that if the power on reset signal is removed, or goes high, after the input supply voltage drops to a specified voltage which is established by the particular microprocessor involved, microprocessor initialization will be precluded and proper microprocessor operation will not be possible. Typically, when the power on reset line is low, i.e., $\overline{POR}$ occurs, the power on reset signal is applied to the microprocessor and when this signal is high, i.e., POR occurs, normal operation is possible.

In a microprocessor application where a high frequency power supply is utilized the aforementioned input signal sequence problem is less likely to occur since short time delays may be introduced in the power on reset signal path for delaying its application to the microprocessor. RC time constants of predetermined duration are generally introduced in the microprocessor input circuitry for delaying the release of the power on reset signal. A diode is generally coupled to the power on reset signal input circuit to provide for its rapid decay following removal of power from the microprocessor. This provision is incorporated to accommodate short duration power outages or rapid ON/OFF cycling of the microprocessor which can result in the power on reset signal leading the input supply voltage applied to the microprocessor. However, because of the voltage drop across this diode required to render it conducting, the power on reset signal tends to remain high inhibiting microprocessor reinitialization following a short power outage or rapid ON/OFF cycling of the microprocessor.

Frequently, as in the case of many television receivers, a high frequency scan-derived power supply may not be utilized. To use a scan-derived power supply, the power supply's impedance must be reduced in order to match that of the horizontal drive transistor in the horizontal sweep circuit. If the power supply lead to the television receiver's tuning system should become dislodged, the load on the horizontal sweep circuit will be substantially reduced resulting in an unsafe combination of cathode ray tube (CRT) high voltage and electron beam current. The relationship between CRT voltage and beam current intensity for a particular CRT is generally provided in the form of an "Isodose" curve. Safety standards dictate that this Isodose curve not be exceeded for the operation of a given CRT, for if exceeded, excessive X-radiation levels will emanate from the CRT.

The aforementioned approach for controlling the power on reset input to a microprocessor with respect to the power supply voltage applied thereto is shown in FIG. 1. The power supply voltage, $V_{CC}$, is provided to a power supply terminal 12 and a power on reset terminal 16 in microprocessor 14. The microprocessor, in response to user initiated inputs from a control device such as a keyboard 64, executes various operations and, in turn, provides appropriate control signals to the controlled device such as the tuner 24 of a television receiver. A grounded capacitor 18 and resistor 20 combination provides a predetermined time constant to the application of the power on reset signal to the microprocessor 14 incorporating a delay therein so as to permit the power supply voltage, $V_{CC}$, to be applied to the microprocessor first. A diode 22 is coupled across the resistor and capacitor network so as to permit the power on reset input to drop off to zero more rapidly than $V_{CC}$, when power is removed from the microprocessor. This insures that $V_{CC}$ will be of sufficient magnitude to energize the microprocessor before application of the power on reset signal to the microprocessor whenever power is lost for only a short period or when the microprocessor is turned OFF and immediately thereafter turned ON.

A conventional approach to controlling the application of the power supply voltage and the power on reset signal to a microprocessor in a television receiver involves the detection of the input supply voltage applied to a voltage regulator. When the output of the power supply reduces to the level where the voltage regulator is no longer able to regulate the power supply voltage, detection circuitry coupled to the power on reset line holds this signal low until the power supply output increases and the voltage regulator once again controls this voltage which energizes the microprocessor. This approach generally utilizes a series regulator for regulating the DC supply output voltage resulting in a considerable variation in the load being imposed upon the power supply which is particularly undesirable where multi-segment light emitting diode (LED) channel number displays are utilized which also impose considerable and widely varying power requirements on the power supply.

The present invention is intended to overcome the aforementioned limitations by providing a microprocessor with a power on reset control arrangement utilizing a shunt voltage regulator coupled to the power supply in a feedback circuit for controlling the application of the power on reset signal with respect to the input supply voltage provided to the microprocessor.

OBJECTS OF THE INVENTION

Accordingly, it is an object of the present invention to provide an improved means for energizing a microprocessor.

It is another object of the present invention to provide for the proper sequential application of power supply and program initialization signals to a microprocessor.

Still another object of the present invention is to control the application of power up and program initialization voltages to a microprocessor driven by a low frequency power supply using a feedback control signal arrangement including a shunt voltage regulator coupling the power supply and the microprocessor.

A still further object of the present invention is to insure proper program initialization of a microprocessor which controls tuner operation in a television receiver.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
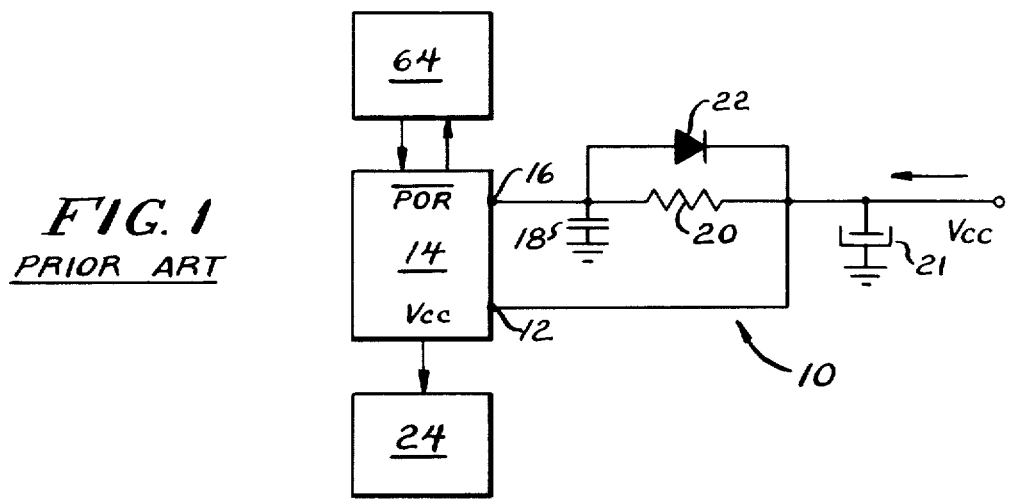
FIG. 1 is a combination block diagram and schematic diagram showing a prior art power on reset and supply voltage circuit for use with a microprocessor.
Figure 2:
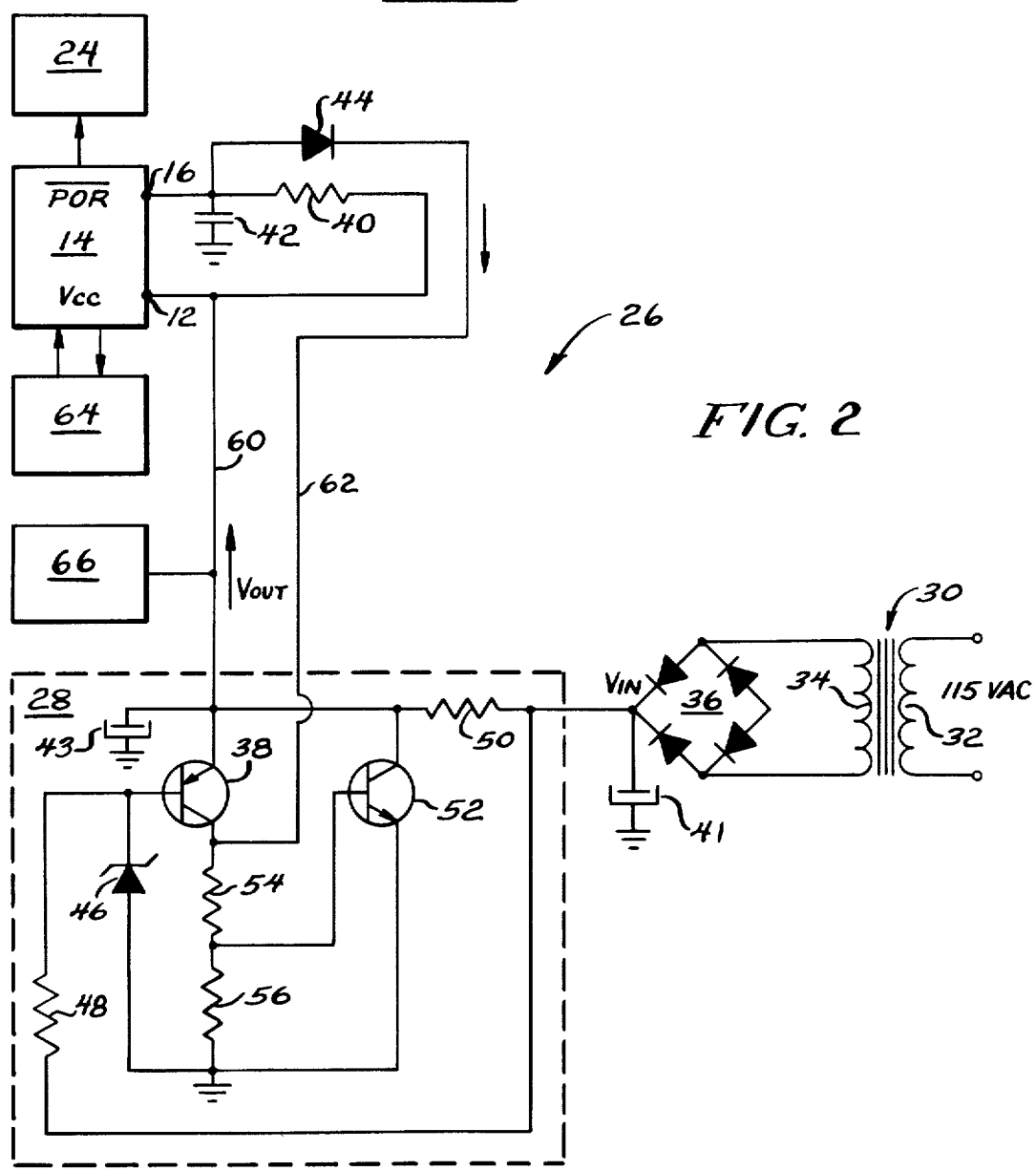
FIG. 2 is a combination block diagram and schematic diagram of a power on reset control system for a microprocessor utilized in controlling a television receiver tuner in accordance with the present invention.

Referring to FIG. 2, there is shown a system 26 for controlling the application of a power on reset ($\overline{POR}$) signal applied to a microprocessor 14 in accordance with the present invention.

A 115 VAC source is coupled to the primary winding 32 of a transformer 30. The secondary winding 34 of the transformer 30 is, in turn, coupled to a conventional diode rectifying bridge 36. The 115 VAC input is stepped down by means of transformer 30 to a lower alternating voltage which is converted to a DC voltage by means of rectifying bridge 36. Although the Figure shows the use of a transformer/rectifying bridge combination as the source of direct voltage in the present invention, other such sources energized by an AC input could as easily be utilized such as a combination of electrolytic capacitors to provide a constant DC voltage. The DC output, $V_{IN}$, from bridge rectifier 36 is provided to a shunt regulator 28 which includes an amplifying transistor 38 and a regulating transistor 52. This shunt regulator arrangement imposes a more constant load on the DC power supply than a conventional series coupled regulator. The regulator output of bridge 36 is applied to the base of amplifier transistor 38 through resistor 48. Coupling the base of amplifier transistor 38 to neutral ground potential is Zener diode 46. When the voltage across Zener diode 46 provided by the output of rectifying bridge 36 exceeds the breakdown voltage of the Zener diode, it is rendered conducting and voltage in excess thereof is shunted to ground. Thus, amplifying transistor 38 is rendered conducting by the input voltage from bridge rectifier 36, which voltage is regulated by means of Zener diode 46. In a preferred embodiment, Zener diode 46 and resistor 48 are selected so as to provide a regulated 4.7 volts applied to the base of amplifier transistor 38.

The output voltage, $V_{OUT}$, is provided via line 60 to the power supply terminal, $V_{CC}$, 12 and the power on reset ($\overline{POR}$) terminal 16 of the microprocessor 14. When powered up and initialized by means of the inputs provided to the $V_{CC}$ and $\overline{POR}$ terminals 12, 16 thereof, and in response to user initiated inputs provided by a controller such as a scanned keyboard 64 the microprocessor 14 provides appropriate control inputs to the tuner 24 of a television receiver for the proper tuning thereof in accordance with the user initiated inputs. Grounded capacitors 41, 43 provide filtering and an appropriate time constant for the microprocessor power on reset system 26 for proper power up and power down thereof.

The output from amplifier transistor 38 is provided to the power on reset terminal 16 of the microprocessor 14 via resistor 40 and grounded capacitor 42. Resistor 40 and capacitor 42 provide a time delay in the arrival of the power on reset signal insuring that it follows the application of the power supply voltage to the $V_{CC}$ terminal of the microprocessor. By thus delaying application of the power on reset signal, proper microprocessor initialization is insured.

A feedback line 62 is provided from the power on reset terminal 16 to the shunt regulator 28. Included in this line is diode 44 which, of course, allows current to flow only from the power on reset terminal 16 to the shunt regulator 28. When $V_{OUT}$ exceeds by one half volt the regulated voltage applied to the base of amplifier transistor 38, diode 44 is rendered conducting and a collector current is initiated in amplifier transistor 38. This collector current will flow to ground via resistors 54, 56 in providing an upper limit to the voltage applied to the power on reset terminal 16 of microprocessor 14. When the voltage across resistor 56 exceeds the turn-on voltage of regulating transistor 52, which in a preferred embodiment is one half volt, transistor 52 will be rendered conducting. With regulating transistor 52 conducting, $V_{IN}$ is shunted via resistor 50, regulating transistor 52 and resistor 56 to ground. This insures that the collector voltage of the amplifier transistor 38 and the voltage applied to other logic circuitry in the system, shown generally as block 66, such as a tuning prescaler and frequency synthesizer will not exceed a predetermined voltage, which in a preferred embodiment is 5.2 V. With the regulating transistor 52 shunting the input current via resistor 50 to ground, resistor 50 thus acts as a current limiting resistor to limit current through the amplifier transistor 38. Thus, regulating transistor 52 limits the voltage levels applied to the microprocessor 14 and other circuitry of the system, which is not a part of the present invention and thus is not shown, by shunting the input voltage $V_{IN}$ to ground when the power on reset voltage exceeds a predetermined voltage level.

In a preferred embodiment, the time delay introduced by resistor 40 and grounded capacitor 42 on the power on reset signal is approximately 10 milliseconds. This is determined by the time required for capacitor 42 to become fully charged after capacitor 43 is charged. $V_{CC}$ is approximately 5 volts in a preferred embodiment, thus $V_{CC}$ is permitted to rise to approximately 4 volts before the initialization signal ($\overline{POR}$) is provided to the power on reset terminal 16 of microprocessor 14.

When the input voltage $V_{IN}$ is removed, the voltage at the base of amplifying transistor 38 goes to zero. This causes the power on reset voltage to be applied across diode 44 rendering it conducting. This, in turn, causes the power on reset signal to be grounded via diode 44 and resistors 54, 56. Thus, when power is removed from the microprocessor 14, the power on reset signal drops to zero virtually instantaneously while $V_{CC}$ decays to zero more slowly. This insures that in the event power is returned immediately after the power outage, $V_{CC}$ and the power on reset signal are applied to proper sequence in the microprocessor to enable it to properly enters its initialization routine.

In a practical example of the present invention, the following values are assigned to various components of the microprocessor power on reset system for insuring proper microprocessor initialization at turn-on or during a power down/power up cycle.

| Reference No. | Preferred Value |
| --- | --- |
| 40 | 100 Kilo-Ohms |
| 41 | 470 Microfarads |
| 42 | 0.15 Microfarads |
| 43 | 470 Microfarads |
| 48 | 1.5 Kilo-Ohms |
| 50 | 27 Ohms |
| 54 | 4.7 Kilo-Ohms |
| 56 | 2.2 Kilo-Ohms |

There has thus been described an arrangement for controlling the application of the power on reset signal and input supply voltage to a microprocessor for insuring proper initialization thereof in the event of a short duration power outage or rapid ON/OFF cycling of the microprocessor.

While particular embodiments of the present invention have been shown and described, it will be apparent to those skilled in the art that changes and modifications may be made therein without departing from the invention and its broader aspects. The aim in the appended claims, therefore, is to cover all such changes and modifications as fall within the true spirit and scope of the invention.

I claim:

1. For a microprocessor energized by a supply signal and initialized by a reset signal wherein said reset signal must be applied to said microprocessor subsequent to the application of said supply signal thereto for proper initialization thereof, a system for sequentially applying first said supply signal and then said reset signal to said microprocessor, said system comprising:
   a DC power supply for generating said supply and reset signals;
   voltage regulation means coupled to said power supply for controlling the voltages of the supply and reset signals applied to said microprocessor;
   first and second circuit means coupling said voltage regulation means and said microprocessor for respectively applying said supply and reset signals thereto, said second circuit means including time delay means for delaying the transmission of said reset signal to said microprocessor for a predetermined time period; and
   grounded conductive means responsive to the supply signal of said DC power supply and coupling said second circuit means to said voltage regulation means for instantaneously grounding said second circuit means in rapidly discharging said reset signal to zero voltage when the supply signal of said DC power supply goes to zero.

2. The system of claim 1 wherein said DC power supply is energized by means of an AC-coupled voltage stepdown transformer in combination with a rectifier bridge circuit.

3. The system of claim 1 wherein said voltage regulation means includes a shunt regulator coupled across a voltage dropping resistor connected to said DC power supply for directing said supply and reset signals to ground when said reset signal exceeds a predetermined voltage in providing constant voltage supply and reset signals to said microprocessor.

4. The system of claim 3 wherein said shunt regulator includes a regulating transistor coupled to said voltage dropping resistor for grounding the current therein when the voltage of said reset signal exceeds a first predetermined voltage and a regulated amplifier transistor coupled to said DC power supply and to said first and second circuit means for limiting said supply signal to a second predetermined voltage level.

5. The system of claim 4 wherein the regulation of said amplifier transistor is provided by a Zener diode and resistor combination coupled to the base thereof.

6. The system of claim 1 wherein said time delay means includes a grounded resistive-capacitive network coupled to a reset terminal of said microprocessor and wherein said predetermined delay time is approximately 10 milliseconds.

7. The system of claim 1 wherein said grounded conductive means coupling said second circuit means to said voltage regulation means includes unidirectional conducting means for instantaneously conducting said reset signal to ground when the output of said DC power supply is removed.

8. The system of claim 1 wherein said microprocessor is coupled to the tuning system of a television receiver for controlling the operation thereof in response to user initiated commands.

9. A system for controlling the application of an initialization signal and input power to a microprocessor to provide proper initialization of said microprocessor, wherein said microprocessor is included in a television receiver for controlling a tuner therein in response to user provided control signals, said system comprising:
   a source of input power;
   voltage regulation means coupling said input power source to said microprocessor for controlling the voltage applied to said microprocessor, said voltage regulation means including a grounded portion thereof;
   first circuit means coupling said voltage regulation means to a power on reset input terminal of said microprocessor for providing said initialization signal thereto, said circuit means including time delay means for delaying the application of said initialization signal to said microprocessor a predetermined time interval after the application of said input power thereto; and
   second circuit means coupling said first circuit means to the grounded portion of said voltage regulation means wherein said second circuit means is rendered conductive upon the removal of input power so as to instantaneously coupled said initialization signal to ground in providing for the more rapid decay of said initialization signal than said input power upon removal of said input power.

* * * * *